US012792730B2

(12) United States Patent
Kasper et al.

(10) Patent No.: US 12,792,730 B2
(45) Date of Patent: Nov. 10, 2026

(54) MONITORING CONTROL BLOCK CHANGES TO DETECT SECURITY BYPASSES

(71) Applicant: International Business Machines Corporation, Armonk, NY (US)

(72) Inventors: Michael Page Kasper, Wappingers Falls, NY (US); Andrew C. M. Hicks, Highland, NY (US); Diane Marie Stamboni, Poughkeepsie, NY (US); Joshua David Steen, Fishkill, NY (US); Christopher V. Derobertis, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 18/883,226

(22) Filed: Sep. 12, 2024

(65) Prior Publication Data

US 2026/0073043 A1 Mar. 12, 2026

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ......................... G06F 21/554; G06F 2221/034
USPC ............................................................ 726/23
See application file for complete search history.

(56) References Cited

U.S. PATENT DOCUMENTS

| | | | | |
|---|---|---|---|---|
| 5,386,525 | A * | 1/1995 | Noack | G06F 9/52 711/170 |
| 11,194,559 | B2 | 12/2021 | Tashkandi | |
| 11,880,483 | B2 | 1/2024 | Durand et al. | |
| 11,943,226 | B2 | 3/2024 | Upton et al. | |
| 11,943,261 | B1 | 3/2024 | Durand et al. | |
| 2007/0177180 | A1 * | 8/2007 | Yamada | H04N 1/32561 358/448 |
| 2020/0104508 | A1 * | 4/2020 | Childs | G06F 12/0646 |
| 2022/0292187 | A1 * | 9/2022 | Bhagi | G06F 21/54 |
| 2024/0273199 | A1 * | 8/2024 | Inui | G06F 21/608 |

OTHER PUBLICATIONS

Berrueta, "A Survey on Detection Techniques for Cryptographic Ransomware", 2019, IEEE, pp. 144925-144941 (Year: 2019).*
Chang, "Towards achieving Data Security with the Cloud Computing Adoption Framework", 2015, IEEE, pp. 1-13 (Year: 2015).*
(Continued)

*Primary Examiner* — Taghi T Arani
*Assistant Examiner* — Gregory A Lane
(74) *Attorney, Agent, or Firm* — Edward J. Wixted, III, Esq.; Rachel L. Pearlman, Esq.; Heslin Rothenberg Farley & Mesiti P.C.

(57) ABSTRACT

Embodiments include identifying a saved copy of a job step control block (JSCB) corresponding to a first address identifier for an operating system, detecting a security issue for a program relating to the operating system that includes determining that the JSCB has changed during operation of a program for the operating system by comparing a current state of the JSCB using the first address identifier to the saved copy of the JSCB, and taking an action to alleviate the security issue.

20 Claims, 5 Drawing Sheets

(56) References Cited

OTHER PUBLICATIONS

Zhang et al., Method for using blockchain to detect integrity anomaly in industrial control systems or other systems, IP.com, Aug. 6, 2021.
Zscaler, Transforming Cybersecurity Response with Zscaler™ using the MITRE ATT&CK™ Framework, 2021.
Check Point Software Technologies Ltd., Software-Defined Protection, Enterprise Security Blueprint.
Idaho National Laboratory, Vulnerability Analysis of Energy Delivery Control Systems, Sep. 2011.
Authors et al., JTAG Security Filter Using Redundant Pass-Through Port, IP.com, Nov. 24, 2009.
Authors et al., Use External Security Manager access event information to detect and alert on reconnaissance ("footprinting") of access to Authorized Program Facility libraries, IP.com, Nov. 23, 2020.

* cited by examiner

MONITORING CONTROL BLOCK CHANGES TO DETECT SECURITY BYPASSES

BACKGROUND

The present invention relates to computing systems, and more specifically, to computer security.

SUMMARY

One embodiment described herein is a method that includes identifying a saved copy of a job step control block (JSCB) corresponding to a first address identifier for an operating system, detecting a security issue for a program relating to the operating system that includes determining that the JSCB has changed during operation of a program for the operating system by comparing a current state of the JSCB using the first address identifier to the saved copy of the JSCB, and taking an action to alleviate the security issue.

One embodiment described herein is a non-transitory computer program product that includes one or more non-transitory computer readable media containing, in any combination, computer program code that, when executed by one or more processors individually or collectively, perform operations. The operations includes identifying a saved copy of a JSCB corresponding to a first address identifier for an operating system, detecting a security issue for a program relating to the operating system that includes determining that the JSCB has changed during operation of a program for the operating system by comparing a current state of the JSCB using the first address identifier to the saved copy of the JSCB, and taking an action to alleviate the security issue.

One embodiment described herein is a system that includes one or more processors and one or more memories storing a program, which, when executed on the one or more processors individually or collectively, performs operations. The operations includes identifying a saved copy of a JSCB corresponding to a first address identifier for an operating system, detecting a security issue for a program relating to the operating system that includes determining that the JSCB has changed during operation of a program for the operating system by comparing a current state of the JSCB using the first address identifier to the saved copy of the JSCB, and taking an action to alleviate the security issue.

DETAILED DESCRIPTION

Figure 1:
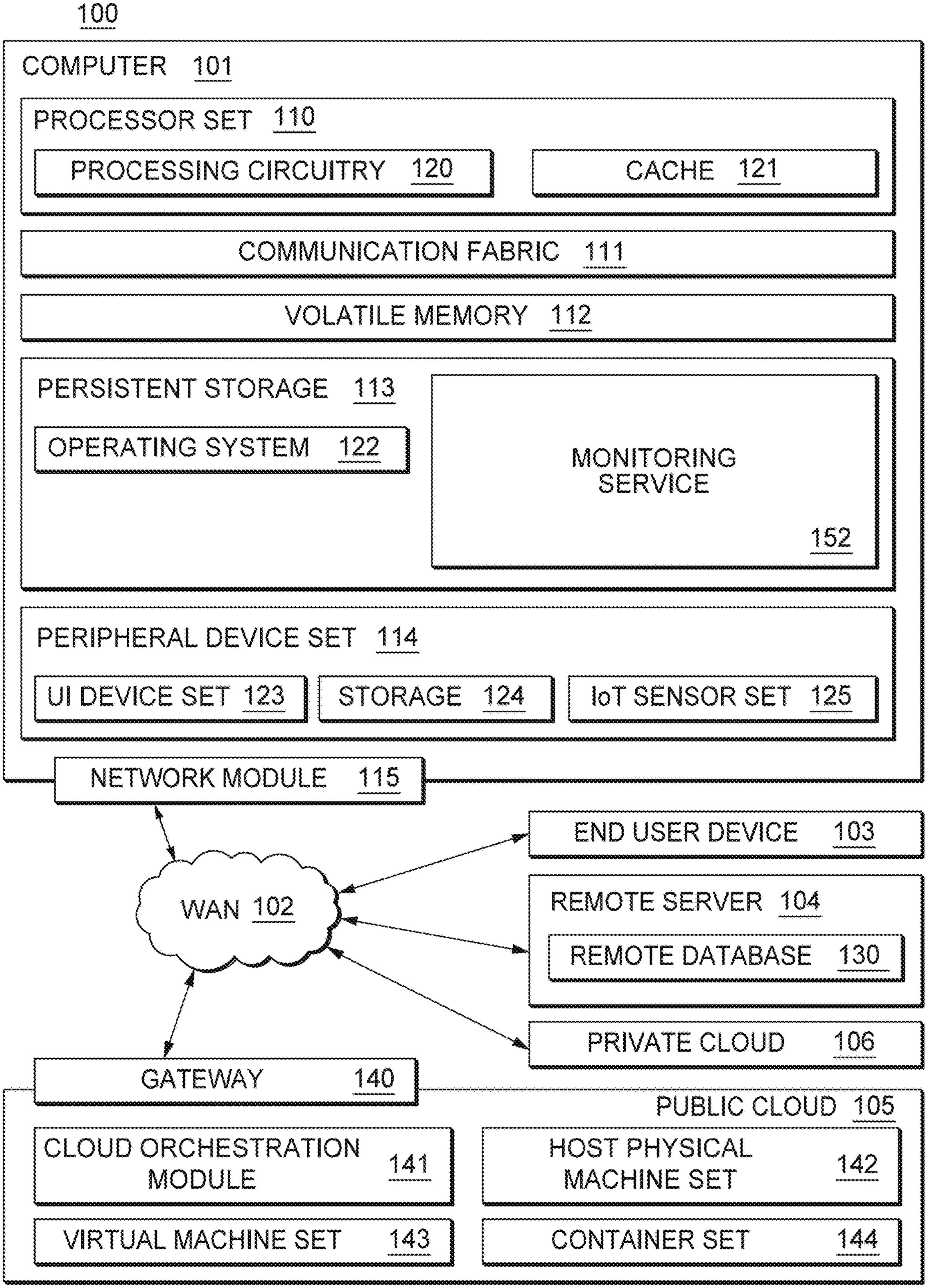
FIG. 1 illustrates a computing environment for monitoring control block changes to detect security bypasses, according to one embodiment.

Resource access services can be used to manage user access to critical resources for computer operating systems. For example, a resource access control facility (RACF) for a mainframe operating system (e.g., z/OS) can offer a service to detect changes to operating system control blocks (e.g., an accessor environment element (ACEE)). In this example, the service can compare the actual contents of a control block (e.g., an ACEE) against the contents of a database (e.g., an RACF database) reflecting the expected contents for the control block. This can detect any unexpected modifications to the fields in the control block made to bypass security controls.

In an embodiment, however, additional control blocks (e.g., a job step control block (JSCB)) may also contain security settings that can impact privileges for a user or task that is not currently being monitored. For example, an authorized program facility (APF) can be used to allow an installation to identify system or user programs that can use sensitive system functions. To maintain system security and integrity, a program must be authorized by the APF before it can access restricted functions, such as MODESET to switch to supervisor state. In an embodiment, the APF helps to avoid integrity exposures by allowing an installation to identify which libraries contain special functions or programs. The JSCBAUTH bit in the JSCB control block can be used to control APF authorization, which grants the ability to call authorized services or load authorized programs to execute in an authorized state. In addition, the JSCBPASS bit can be used to bypass data sets authorization requirements in some cases. This makes identifying changes to the JSCB very important for security (e.g., in addition to identifying changes to the ACEE or other control blocks).

One or more techniques described herein extend monitoring to the JSCB by saving a protected and system key copy at a location in a system address space or data space not available or easy to find for other address spaces, and monitoring for any security relevant changes by scheduling service request blocks (SRBs), creating access list entry tokens (ALETs), or any other suitable means, for each address space at a specified timing interval. For example, an SRB can check if a baseline copy of the JSCB already exists for a unique identifier (e.g., a STOKEN) identifying a specific address space. If no baseline copy of the JSCB exists, then a copy can be saved for future reference. But if a copy is found, the system can compare the saved version to the current control block status. If there are any changes, the system can send an alert, create a report with relevant information on the potential security vulnerability, or take any other suitable action. Further, once modification is detected a storage alteration interrupt (e.g., a SLIP) could also be set to capture a system dump the next time it occurs. This can be used to identify which program and line of code is modifying a JSCB.

This is merely an example. Alternatively, or in addition, a system could make use of installation exit points to capture a copy of the JSCB automatically and make comparisons throughout the life of the address space automatically. For example, the comparisons could be made when loading a program, calling the MODESET function, opening a data set, closing a data set, or during task termination (e.g., instead of, or in addition to, scheduling SRBs). The benefit of this approach is that it could capture timing windows where the JSCB has been temporarily modified to bypass authorization checks, which a timer exit or SRB might miss.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system. "

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100 for monitoring control block changes to detect security bypasses, according to one embodiment. The computing environment 100 contains an example of an environment for the execution of at least some of the computer code involved in performing the inventive methods, such as a monitoring service 152 for monitoring control block changes to detect security bypasses. In addition to block 152, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 152, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip.

" In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 152 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 152 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images. " A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
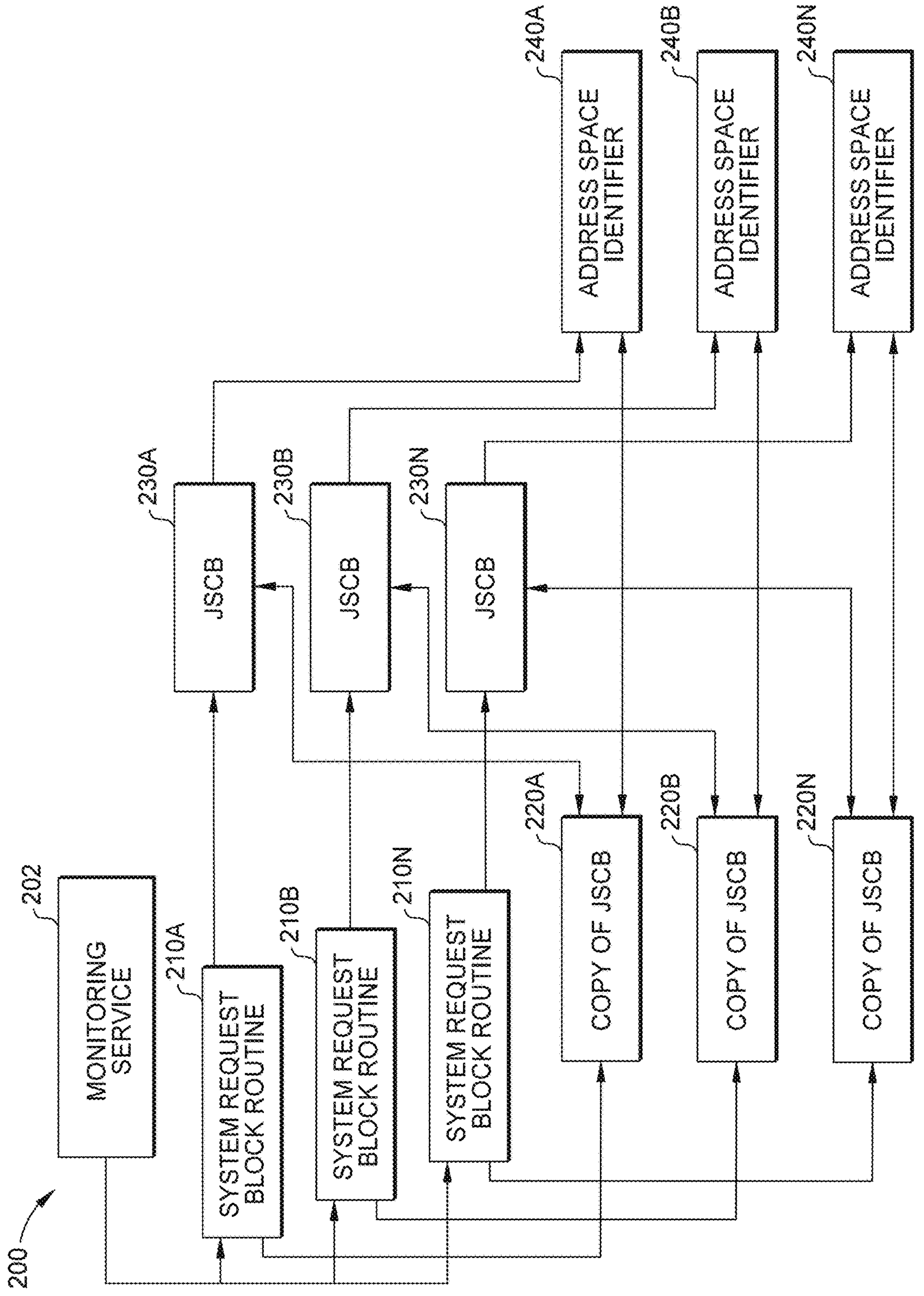
FIG. 2 illustrates a block diagram for monitoring control block changes to detect security bypasses, according to one embodiment.

FIG. 2 illustrates a block diagram 200 for monitoring control block changes to detect security bypasses, according to one embodiment. In an embodiment, a monitoring service 202 (e.g., the monitoring service 152 illustrated in FIG. 1, or any other suitable software service) schedules one or more system request block routines 210A-N (e.g., SRBs, tasks with ALETs, or any other suitable work units) to monitor for security relevant changes to system control blocks (e.g., JCSBs).

For example, the monitoring service 202 can schedule a system request block routine 210A to compare a copy of a JSCB 220A (which is one example of a system control block) corresponding to an address space identifier 240A (e.g., a STOKEN) against a current JSCB 230A corresponding to an address space identifier 240A. If the system request block routine 210A identifies changes (e.g., security relevant changes) by comparing the copy of the JSCB 220A against the JSCB 230A, corresponding to the address space identifier 240A, the monitoring service can send an alert, create a report with relevant information on the potential security vulnerability, or take any other suitable action. This is discussed further below with regard to FIGS. 3-4.

Similarly, the monitoring service 202 can schedule an system request block routine 210B to compare a copy of a JSCB 220B corresponding to an address space identifier 240B against a current JSCB 230B corresponding to an address space identifier 240B. And the monitoring service 202 can schedule an system request block routine 210N to compare a copy of a JSCB 220N corresponding to an address space identifier 240N against a current JSCB 230N corresponding to an address space identifier 240N. These are merely examples, and the task monitor can use any suitable number or type of system control blocks, task control blocks, and address space identifiers.

Figure 3:
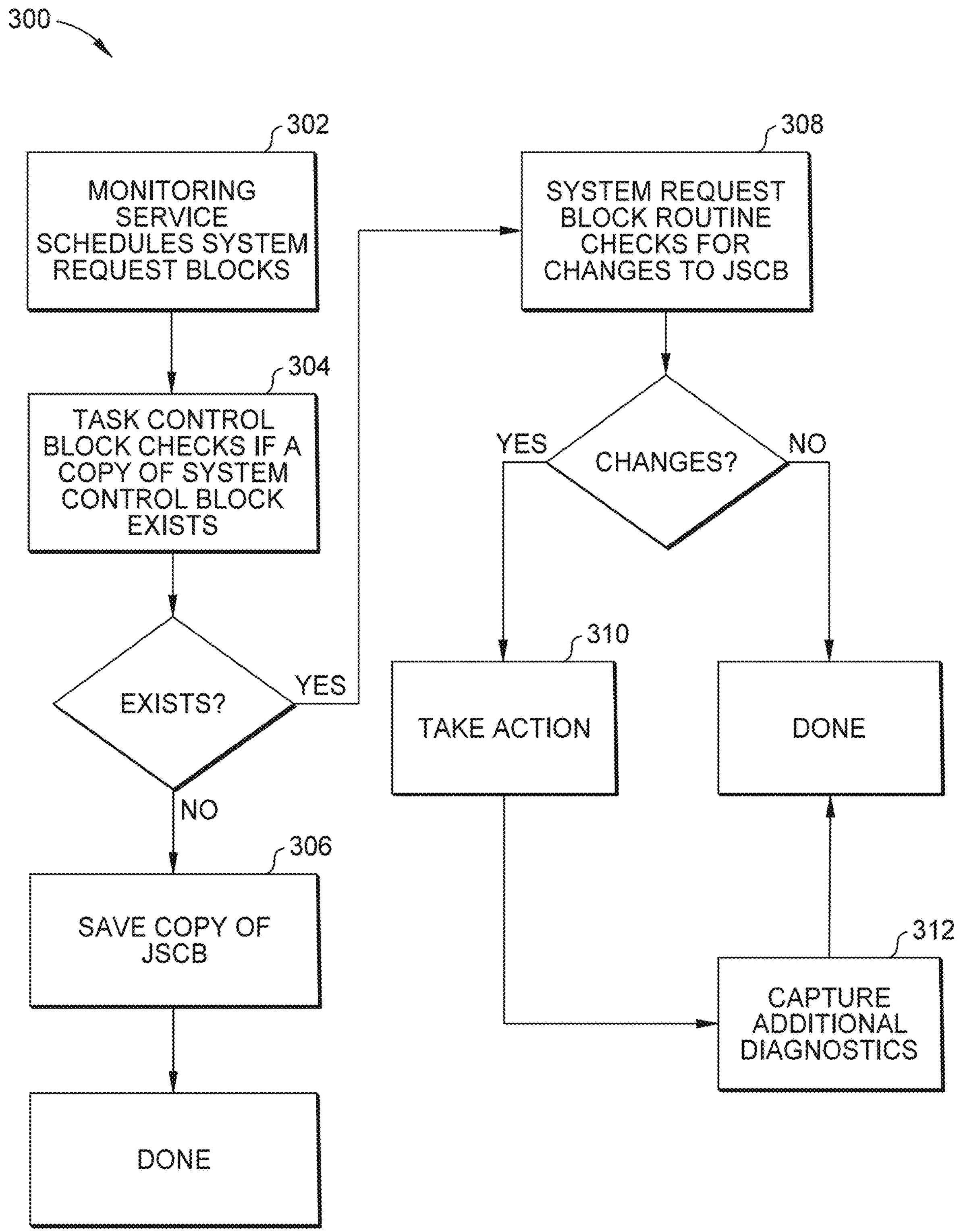
FIG. 3 illustrates a flowchart for monitoring control block changes to detect security bypasses, according to one embodiment.

FIG. 3 illustrates a flowchart 300 for monitoring control block changes to detect security bypasses, according to one embodiment. At block 302, a monitoring service (e.g., the monitoring service 152 illustrated in FIG. 1) schedules system request blocks (e.g., SRBs, ALETs, or any other suitable system request blocks). As discussed above, in an embodiment the monitoring service monitors for security bypasses in JCSBs. For example, the monitoring service can schedule system request blocks to compare a saved copy of a JSCB, if one is available, to a current JSCB status.

Scheduling task control blocks is merely one example. Alternatively, or in addition, the monitoring service can make use of installation exit points to capture a copy of the JSCB automatically. The monitoring service can then make comparisons throughout the life of the address space automatically, such as when loading a program, opening a data set, or during task termination. This can be done instead of, or in addition to, scheduling system request blocks. This is discussed further, below, with regard to FIG. 5.

At block 304 a system request block (e.g., scheduled by the monitoring service at block 302) checks if a copy of a JSCB exists. In an embodiment, the system request block checks whether an existing copy of a JCSB corresponding to a given address space identifier (e.g., a given STOKEN) exists. For example, as illustrated in FIG. 2, a JSCB 230A checks whether a copy of a JSCB 220A exists for a given address space identifier 240A.

If the system request block does not identify a copy of the JSCB, the flow proceeds to block 306. At block 306, the system request block, monitoring service, or any other suitable software service saves a copy of the JSCB. For example, again looking at FIG. 2, the JSCB 230A can create the copy of JSCB 220A by saving a baseline copy of the current JSCB in a suitable electronic repository.

Returning to block 304, if the system request block identifies a copy of the JSCB, the flow proceeds to block 308. At block 308, the system request block checks for changes to the JSCB. For example, the system request block compares the saved baseline copy of the JSCB to the current JSCB status. Using the illustration of FIG. 2, the JSCB 230A compares the copy of JSCB 220A with the current system JSCB status maintained in memory at the address space corresponding to the address space identifier 240A.

In an embodiment, however, it can be challenging for the system request block to determine whether a JSCB has changed. For example, in order to identify changes to a JSCB, the system request block must establish a baseline so that the system request block can identify future changes as unexpected or unsafe. This can be addressed by scheduling JSCBs frequently enough so that the first discovery of a new address space (e.g., to save a copy of the system control block state as discussed above in relation to block 306) represents a close enough approximation of the initial state of the address space to use as the baseline.

This is just one example. Alternatively, or in addition, the system request block could identify changes to the JSCB without using a copy of the JSCB. In an embodiment, the system request block could determine the attributes of the program being controlled (e.g., the job step program corresponding to a JSCB), and the expected JSCB attributes based on that program. For example, the system request block could determine whether the program is linked in an authorized library and whether there are any corresponding entries in a properties table (e.g., a program properties table (PPT)) for the program. The system request block can use these instead of, or in addition to, comparing the current state of the JSCB to the saved copy.

Further, in an embodiment, not all changes to a JSCB reflect unsafe changes. As one example, a system request block could identify unsafe changes by identifying when a control block authorization state has been enabled (e.g., after previously being disabled). One general rule is that once system control block authorization is given up (e.g., by turning off a JCSBAUTH authorization state for a JCSB), it is never safe to turn the authorization state back on. This is because unauthorized programs could have been established or scheduled timer interrupts that would run during authorized execution and gain privileges as a result.

For example, since the initial JSCBAUTH flag is set for a JSCB during address space initialization by the operating system, there should be no reason for a program to turn the flag on. In some circumstances, however, there might also be address spaces that need authorization during initialization but not during normal execution. Those address spaces could safely turn off the authorization state (e.g., turn off JSCBAUTH) if they do not turn it back on. As a result, the event that indicates a security vulnerability is when the authorization state is turned on. The system request block could flag that, and not flag turning off the authorization state.

If the system request block identifies changes for the JSCB, the flow proceeds to block 310. At block 310, the monitoring service (or any other suitable software service) takes action. For example, the monitoring service can send an alert or create a report with relevant information on the potential security vulnerability.

At block 312, the monitoring service captures additional diagnostics. In an embodiment, the monitoring service can identify which program, line of code, or both is modifying a JCSB. For example, once modification is detected (e.g., at block 308) the monitoring service can set a storage alteration interrupt (e.g., serviceability level indication processing (SLIP)) event to capture a system dump the next time modification occurs.

Figure 4:
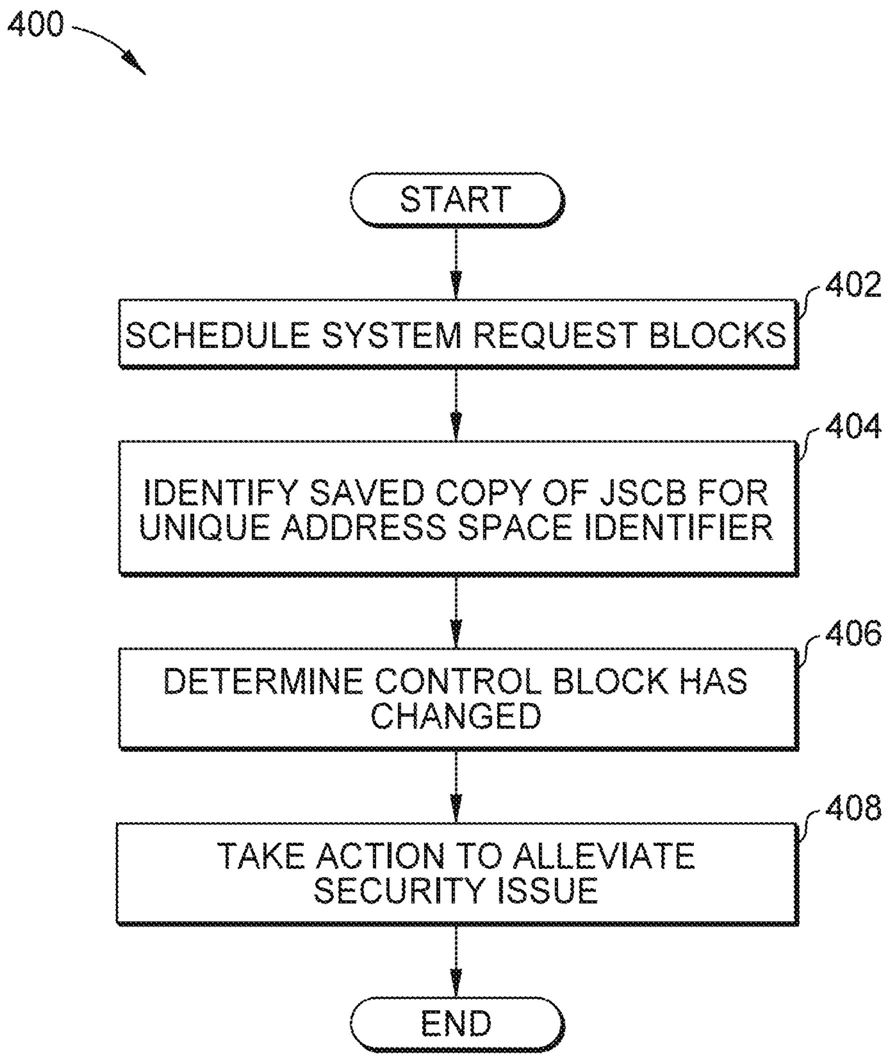
FIG. 4 illustrates a further flowchart for monitoring control block changes to detect security bypasses, according to one embodiment.

FIG. 4 illustrates a further flowchart 400 for monitoring control block changes to detect security bypasses, according to one embodiment. At block 402, a monitoring service (e.g., the monitoring service 152 illustrated in FIG. 1) schedules system request blocks (e.g., SRBs, ALETs, or any other suitable task control blocks). As discussed above in relation to block 302 illustrated in FIG. 3, in an embodiment the monitoring service schedules system request blocks to compare a saved copy of a JSCB, if one is available, to a current JSCB status.

At block 404, the system request block identifies a saved copy of the JSCB for a unique address space identifier. As discussed above in relation to block 304 illustrated in FIG. 3, in an embodiment the system request block checks whether an existing copy of a a JCSB corresponding to a given address space identifier (e.g., a given STOKEN) exists.

At block 406, the system request block determines the JSCB has changed. As one example, as discussed above in relation to block 308 illustrated in FIG. 3, the system request block compares the saved baseline copy of the JSCB to the current system JSCB status.

At block 408, the system request block takes action to alleviate the security issue. In an embodiment, as discussed above in relation to block 310 illustrated in FIG. 3, the monitoring service can send an alert or create a report with relevant information on the potential security vulnerability.

Further, the monitoring service can capture additional diagnostics to identify which program, line of code, or both is modifying a JCSB.

For example, the monitoring service can send an alert to another aspect of the OS, another software service, a local administration system, a remote administration system, or any other suitable destination, or can generate a report indicating the security issue (e.g., memorializing operational information for the security issue). These alerts or reports can be used by an automated system (e.g., a diagnostic software service) or a human administrator to identify the security issue, cure the security issue, or take any other suitable action. In an embodiment, these are merely examples and the detection service can take any suitable action or actions.

Figure 5:
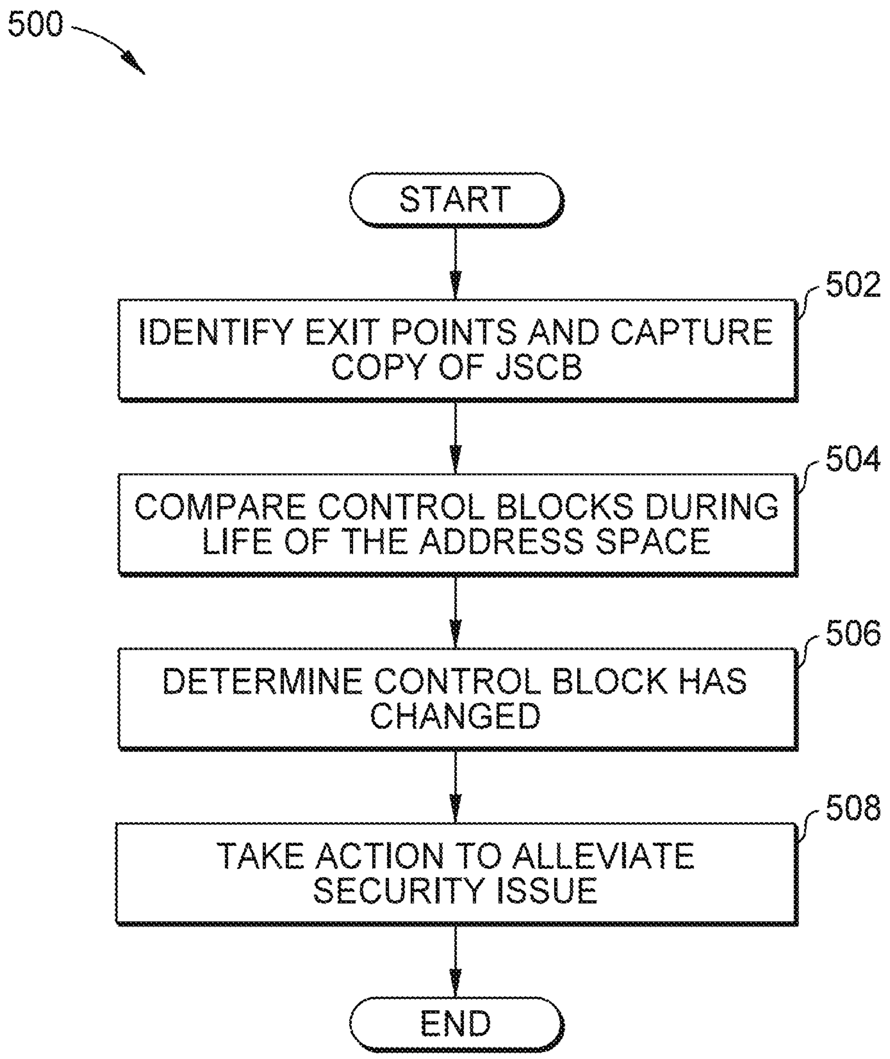
FIG. 5 illustrates a flowchart for automatic monitoring of control block changes to detect security bypasses, according to one embodiment.

FIG. 5 illustrates a flowchart 500 for automatic monitoring of control block (e.g., a JSCB) changes to detect security bypasses, according to one embodiment. In an embodiment, as discussed above in relation to FIGS. 2-4, a monitoring service (e.g., the monitoring service 152 illustrated in FIG. 1) schedules one or more system request blocks to detect security bypasses. This is merely one example. Alternatively, or in addition, the monitoring service can to capture a copy of the JSCBs automatically, without use of a system request block.

At block 502, the monitoring service identifies exit points and captures copies of the JSCBs. In an embodiment, the monitoring service can make use of installation exit points to capture a copy of the JSCBs automatically. For example, using the example illustrated in FIG. 2, the monitoring service can identify an exit point and create the copy of JSCB 220A by saving a baseline copy of the current JSCB in a suitable electronic repository. This is merely an example, and the monitoring service can capture a copy of the JSCB at any suitable point in time using any suitable technique.

At block 504, the monitoring service compares control blocks during the life of the address space. For example, the monitoring service can make comparisons between a saved baseline copy of the JSCB and a current JSCB status, throughout the life of the address space, automatically (e.g., when loading a program, opening a data set, during task termination, or at any other suitable point in time). Using the illustration of FIG. 2, the monitoring service compares the copy of JSCB 220A with the current JSCB status maintained in memory at the address space corresponding to the address space identifier 240A. This can be done instead of, or in addition to, scheduling system request blocks.

At block 506, the monitoring service determines the JSCB has changed. As discussed above in relation to block 308 illustrated in FIG. 3, the monitoring service can identify changes between the saved baseline copy of the JSCB and a current JSCB status. This is just one example. Alternatively, or in addition, the monitoring service could identify changes to the JSCB without using a copy of the JSCB (e.g., by determining the attributes of the program being controlled and the expected JSCB attributes based on that program).

At block 508, the monitoring service takes action to alleviate the security issue. In an embodiment, as discussed above in relation to block 310 illustrated in FIG. 3 and 408 illustrated in FIG. 4, the monitoring service can send an alert or create a report with relevant information on the potential security vulnerability. Further, the monitoring service can capture additional diagnostics to identify which program, line of code, or both is modifying a JCSB.

While the foregoing is directed to embodiments of the present invention, other and further embodiments of the invention may be devised without departing from the basic scope thereof, and the scope thereof is determined by the claims that follow.

What is claimed is:

1. A method comprising:

identifying a saved copy of a job step control block (JSCB) corresponding to a first address identifier for an operating system, wherein the saved copy of the JSCB is a saved protected copy saved at a system address space location for the first address identifier;

detecting a security issue for a program relating to the operating system, comprising:

determining that a given state of the JSCB has changed during operation of the program for the operating system by comparing a current state of the JSCB using the first address identifier to the saved protected copy of the JSCB thereby indicating the security issue; and taking an action to alleviate the security issue, wherein the action comprises at least one of: (i) generating an alert relating to the security issue or (ii) generating a report relating to the security issue.

2. The method of claim 1, further comprising:

scheduling a task control block to monitor state changes of the JSCB to the saved protected copy of the JSCB.

3. The method of claim 2, wherein the task control block comprises at least one of: (i) a service request block (SRB) or (ii) an access list entry tokens (ALET).

4. The method of claim 3, wherein the task control block comprises the SRB.

5. The method of claim 1, wherein the first address identifier comprises an STOKEN.

6. The method of claim 1, wherein detecting the security issue for the program relating to the operating system comprises detecting the state change of the JSCB relating to bypassing security controls.

7. The method of claim 6, wherein taking the action to alleviate the security issue comprises identifying when a control block authorization state has been enabled in the current state of the JSCB.

8. A non-transitory computer program product comprising:

one or more non-transitory computer readable media containing, in any combination, computer program code that, when executed by one or more processors individually or collectively, perform operations comprising:

identifying a saved copy of a job step control block (JSCB) corresponding to a first address identifier for an operating system, wherein the saved copy of the JSCB is a saved protected copy saved at a system address space location for the first address identifier;

detecting a security issue for a program relating to the operating system, comprising:

determining that a given state of the JSCB has changed during operation of the program for the operating system by comparing a current state of the JSCB using the first address identifier to the saved protected copy of the JSCB thereby indicating the security issue; and taking an action to alleviate the security issue, wherein the action comprises at least one of: (i) generating an alert relating to the security issue or (ii) generating a report relating to the security issue.

9. The non-transitory computer program product of claim 8, the operations further comprising:

scheduling a task control block to monitor state changes of the JSCB to the saved protected copy of the JSCB.

10. The non-transitory computer program product of claim 9, wherein the task control block comprises at least one of: (i) a service request block (SRB) or (ii) an access list entry tokens (ALET).

11. The non-transitory computer program product of claim 10, wherein the task control block comprises the SRB.

12. The non-transitory computer program product of claim 8, wherein the first address identifier comprises an STOKEN.

13. The non-transitory computer program product of claim 8, wherein detecting the security issue for the program relating to the operating system comprises detecting the state change of the JSCB relating to bypassing security controls.

14. The non-transitory computer program product of claim 13, wherein taking the action to alleviate the security issue comprises identifying when a control block authorization state has been enabled in the current state of the JSCB.

15. A system, comprising:

one or more processors; and one or more memories storing a program, which, when executed on the one or more processors individually or collectively, performs operations, the operations comprising:

identifying a saved copy of a job step control block (JSCB) corresponding to a first address identifier for an operating system, wherein the saved copy of the JSCB is a saved protected copy saved at a system address space location for the first address identifier;

detecting a security issue for a program relating to the operating system, comprising:

determining that a given state of the JSCB has changed during operation of the program for the operating system by comparing a current state of the JSCB using the first address identifier to the saved protected copy of the JSCB thereby indicating the security issue; and taking an action to alleviate the security issue, wherein the action comprises at least one of: (i) generating an alert relating to the security issue or (ii) generating a report relating to the security issue.

16. The system of claim 15, the operations further comprising:

scheduling a task control block to monitor state changes of the JSCB to the saved protected copy of the JSCB.

17. The system of claim 16, wherein the task control block comprises at least one of: (i) a service request block (SRB) or (ii) an access list entry tokens (ALET).

18. The system of claim 17, wherein the task control block comprises the SRB.

19. The system of claim 15 wherein detecting the security issue for the program relating to the operating system comprises detecting the state change of the JSCB relating to bypassing security controls.

20. The system of claim 19, wherein taking the action to alleviate the security issue comprises identifying when a control block authorization state has been enabled in the current state of the JSCB.

* * * * *